United States Patent
Parkos et al.

(10) Patent No.: US 7,404,521 B2
(45) Date of Patent: Jul. 29, 2008

(54) PAPER BASED MAILING AND SHIPPING USER INTERFACE

(75) Inventors: Arthur J. Parkos, Southbury, CT (US); Jean-Hiram Coffy, Norwalk, CT (US); Jacques E. Hasbani, Easton, CT (US)

(73) Assignee: Pitney Bowes Inc., Stamford, CT (US)

( * ) Notice: Subject to any disclaimer, the term of this patent is extended or adjusted under 35 U.S.C. 154(b) by 369 days.

(21) Appl. No.: 11/020,352

(22) Filed: Dec. 23, 2004

(65) Prior Publication Data

US 2006/0138210 A1  Jun. 29, 2006

(51) Int. Cl.
    *G06K 7/10*  (2006.01)
(52) U.S. Cl. .............................. 235/462.49; 235/472.03
(58) Field of Classification Search ............ 235/462.15, 235/462.49, 472.01, 472.02, 472.03; 358/1.14, 358/1.18; 345/179; 705/401, 405, 410
See application file for complete search history.

(56) References Cited

U.S. PATENT DOCUMENTS

| | | | | |
|---|---|---|---|---|
| 4,248,528 A | | 2/1981 | Sahay | 355/14 R |
| 4,609,283 A | | 9/1986 | Murata et al. | 355/14 R |
| 4,757,348 A | | 7/1988 | Rourke et al. | 355/6 |
| 4,825,058 A | * | 4/1989 | Poland | 235/462.01 |
| 4,847,656 A | | 7/1989 | Kuno et al. | 355/202 |
| 5,534,975 A | | 7/1996 | Stefik et al. | 355/202 |
| 5,648,648 A | * | 7/1997 | Chou et al. | 235/382 |
| 5,729,350 A | | 3/1998 | Ozaki | 358/296 |
| 5,974,202 A | | 10/1999 | Wang et al. | 382/306 |
| 6,175,714 B1 | | 1/2001 | Crean | 399/366 |
| 6,275,745 B1 | | 8/2001 | Critelli et al. | 700/227 |
| 6,481,627 B1 | * | 11/2002 | Guerreri | 235/472.01 |
| 6,592,039 B1 | * | 7/2003 | Smith et al. | 235/462.49 |
| 6,872,715 B2 | * | 3/2005 | Santi et al. | 514/183 |
| 2002/0149573 A1 | | 10/2002 | Picoult et al. | 345/179 |
| 2004/0027604 A1 | * | 2/2004 | Jeran et al. | 358/1.14 |
| 2004/0064486 A1 | | 4/2004 | Braun et al. | 707/203 |
| 2005/0178843 A1 | * | 8/2005 | Frolich et al. | 235/487 |

FOREIGN PATENT DOCUMENTS

| | | |
|---|---|---|
| EP | 1403756 A2 | 3/2004 |
| EP | 1403777 A2 | 3/2004 |
| EP | 1404106 A3 | 9/2004 |
| EP | 1435593 A3 | 5/2006 |
| EP | 1439497 A3 | 5/2006 |
| EP | 1477937 A3 | 1/2007 |
| WO | 2004/003854 A3 | 1/2004 |

* cited by examiner

*Primary Examiner*—Thien M. Le
*Assistant Examiner*—Kumiko C. Koyama
(74) *Attorney, Agent, or Firm*—George M. Macdonald; Angelo N. Chaclas

(57) ABSTRACT

In paper based user interfaces to machines, a business machine receives user input from a digital pen and paper system and determines if such input is authorized. In another example, a business machine processes a batch of prewritten user inputs from a digital pen and paper system when the digital pen is collocated operatively connected to the business machine.

12 Claims, 5 Drawing Sheets

400

CONSIGNEE SELECTION FORM

412 — ABC COMPANY ☐    ☐ KAPPA COMPANY — 422
414                                                         424

416 — JULIET COMPANY ☐    ☐ XYZ COMPANY — 426
418                                                         428

CHOOSE A CONSIGNEE BY CHECKING A BOX

PAPERSHIP

DESTINATION ADDRESS

452

TO
ATTN
ADDR1
ADDR2
CITY
STATE         ZIP

454

DELIVERY REQUIREMENTS

☐ NEXT DAY

☐ 2ND DAY

RECIPIENT EMAIL [____] — 467

OF PACKAGES [____] — 462

WEIGHT [____] — 464

SIGNATURE [_____] — 466

FIG. 4B

PAPER BASED MAILING AND SHIPPING USER INTERFACE

BACKGROUND

The illustrative embodiments described in the present application are useful in systems including those for controlling machines and more particularly are useful in systems including those for providing co-located paper based user interfaces to mailing and shipping systems.

There are several categories of conventional business machines in ubiquitous use today. The typical large office environment may include centralized business machine centers that often include copy machines, facsimile machines, printers, and mailing machines. In a typical small home office environment, business machines are often located in a single office and may include multi-function business machines such as a combined printer/scanner/copier/facsimile unit. Business machines are also found in other environments such as production mail facilities and copy centers.

Systems such as office machines including copiers, facsimile machines and mailing machines often include a user interface that provides a keypad and display. The user interface is utilized to control the functions of the machine and to receive operating parameter input from the operator such as the number of copies to be made or the value of postage desired. Such user interfaces may require the user to navigate through several layers of menus to perform a particular task.

Multi-user settings often utilize business machine usage accounting systems for tracking usage of the business machines according to various criteria. The criteria could include a user identification number, a client identification number and/or a particular matter identification number. Furthermore, a system may require a user to input acceptable account numbers before allowing access to the business machine. The usage accounting systems typically employ a separate accounting processor connected to the business machine having a separate user interface. Several models of mailing machines are available from Pitney Bowes of Stamford, Conn.

Certain business machine systems that utilize operator marked control sheets have been described. For example, a copier with document sensing control is described in U.S. Pat. No. 4,248,528 issued Feb. 3, 1981 to Sahay. Additionally, a document control system and method for digital copiers is described in U.S. Pat. No. 6,175,714 B1 issued Jan. 16, 2001 to Crean.

A document processing system utilizing document service cards to provide document processing services is described in U.S. Pat. No. 5,534,975, issued Jul. 9, 1996 to Stefik, et al. The document service cards are fed to the document processing platform. An apparatus and method for processing a machine readable document with embedded machine instructions is described in U.S. Pat. No. 5,974,202 issued Oct. 26, 1999 to Wang, et al.

Many business machines use keypad and display user interfaces and some include accounting processors. Some business machines have been described that read operating instructions from paper. The prior art does not provide a system and method for providing access level capable and/or authenticated paper based user interfaces to machines such as shipping and mailing machines. Additionally, the prior art does not provide for an accounting and/or batching system using a paper based user interface to machines such as shipping and mailing machines.

SUMMARY

Accordingly, it is an object of the present application to describe systems and methods for providing paper based user interfaces to machines.

For example, in one illustrative embodiment, a business machine receives user input from a digital pen and paper system and determines if such input is authorized.

In another illustrative embodiment, a business machine processes a batch of prewritten user inputs from a digital pen and paper system when the digital pen is collocated operatively connected to the business machine.

In yet another illustrative embodiment, a business machine processes user inputs received from a digital pen and paper system before executed the instructions corresponding to the user input.

Therefore, it should now be apparent that the invention substantially achieves all the above aspects and advantages. Additional aspects and advantages of the invention will be set forth in the description that follows. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIGS. 4A and 4B are top plan views of illustrative digital paper forms according to an illustrative embodiment of the present application.

DETAILED DESCRIPTION

Illustrative systems and methods useful for providing user input to a machine with a digital pen and digital paper interface are described. Additionally, systems and methods for authenticating and accounting for use of a business machine are provided. Furthermore, systems and methods for receiving and storing batches of user inputs for later processing are described. As described herein, the illustrative embodiments describe systems and methods that are useful in many respects including in providing user input to machines. For example, a particular digital pen may be assigned to a particular machine operator. Access to and control of a digital pen could be used to authenticate a user, resolve levels of access authority and perform accounting functions. Similarly, authentication may be performed using the authentication features of the digital pen such as biometrics processing. In one alternative, the user may be remotely located from the business machine and could use the digital pen and paper system to batch inputs to the machine. The machine could then process that batch of inputs when the pen was brought into proximity of the machine such as when docked in a cradle connected to the machine. The machine could also receive the instructions as they are input in batch mode so that the machine could perform preparatory functions before actually executing the commands contained in the input stream.

Certain machines such as mailing machines may have limited user interfaces with low-resolution graphics or character based screens and small keyboards. Traditional paper based mailing instruction forms must be processed by a mailroom user and do not allow for timely capture or transmittal of information. Additionally, a user must be physically located at the machine to enter information and only one user can operate the machine at a time. As described herein, paper based user input mechanisms for mailing and shipping systems are described that provide a user-friendly input mechanism with the familiarity of pen and paper. The digital pen and digital paper act as the user interface to the mailing machine. Such a system provides a readily accessible receipt on any size paper such as standard letter size paper after the form is completed. A digital pen and digital paper system allows a user to fill in a mailing or shipping machine input screen on paper, transmit the form to the mailing machine via a wired or wireless link, complete the transaction, print any required labels and capture the information electronically. That information could then be transmitted to a customer host environment or to external systems such as a carrier host computer system.

Figure 1:
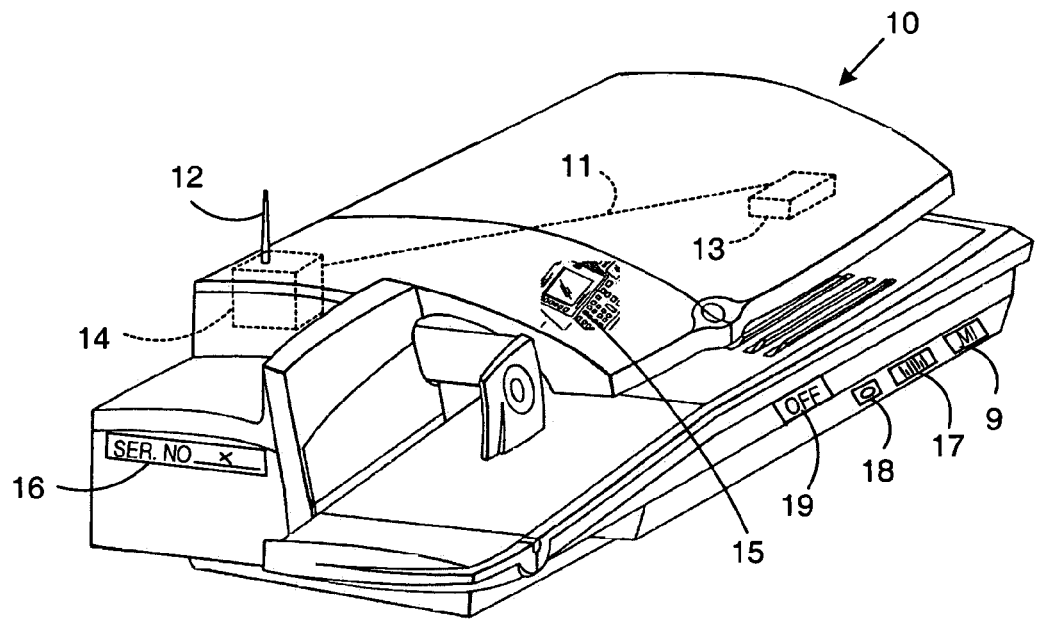
FIG. 1 is a perspective view of an illustrative mailing machine according to an illustrative embodiment of the present application.

Referring to FIG. 1, an illustrative machine comprising a mailing machine 10 according to an illustrative embodiment of the present application is described. Mailing machine 10 includes a user interface 15, a serial number label 16, emergency off button 19, infrared transceiver 18, identification bar code 20, identification machine name plate 22. Additionally, the mailing machine includes a BLUETOOTH transceiver and controller 14 having antenna 14 that interfaces with the mailing machine control logic (not shown). Furthermore, the user interface access portion of 14 is connected to the secure print processor 30 using secure connection 32. The transceiver 14 may be used to interface with an external digital pen or other processor.

Figure 2:
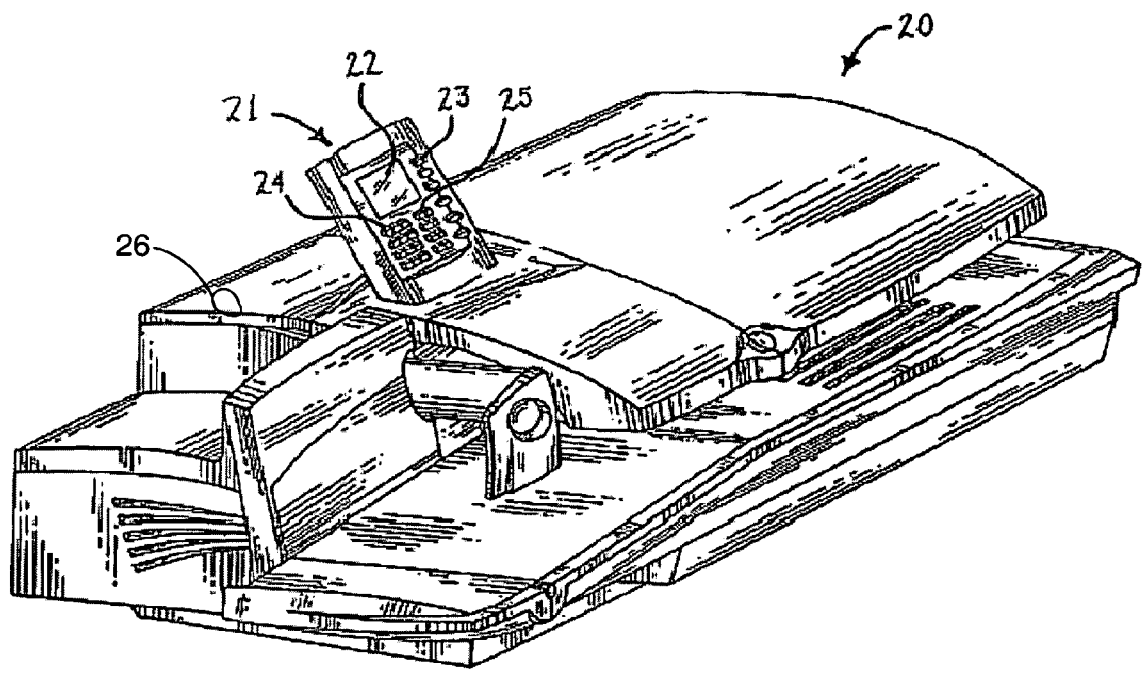
FIG. 2 is a perspective view of an illustrative mailing machine according to another illustrative embodiment of the present application.

Referring to FIG. 2, another illustrative machine comprising a mailing machine 20 according to another illustrative embodiment of the present application is described. The mailing machine 20 includes a printer module (not shown), a conveyor apparatus (not shown), a micro control system (not shown), other modules not shown for the sake of clarity, and user interface equipment 21 including a set of function keys 23, a numeric keypad 24, a set of (non-function-type) keys 25, and a display 22 such as an LCD display. The keypads and display allow a user to perform mailing machine functions including commands that are not directly related to processing a mail piece, such as enter, clear, download postage, generate report, and account setup. Additionally, the user may input commands related to processing a mailpiece, such as start, stop, print tape, reset batch counter, weigh mode on/off, sealer/moistener mode on/off. Such menu choices may involve the negotiation of several layers of command menus. The mailing machine 20 may be connected to a digital pen and/or related processing system using a wired or wireless interface. The mailing machine 20 also includes a digital pen docking station 26 for receiving digital pen input.

Figure 3:
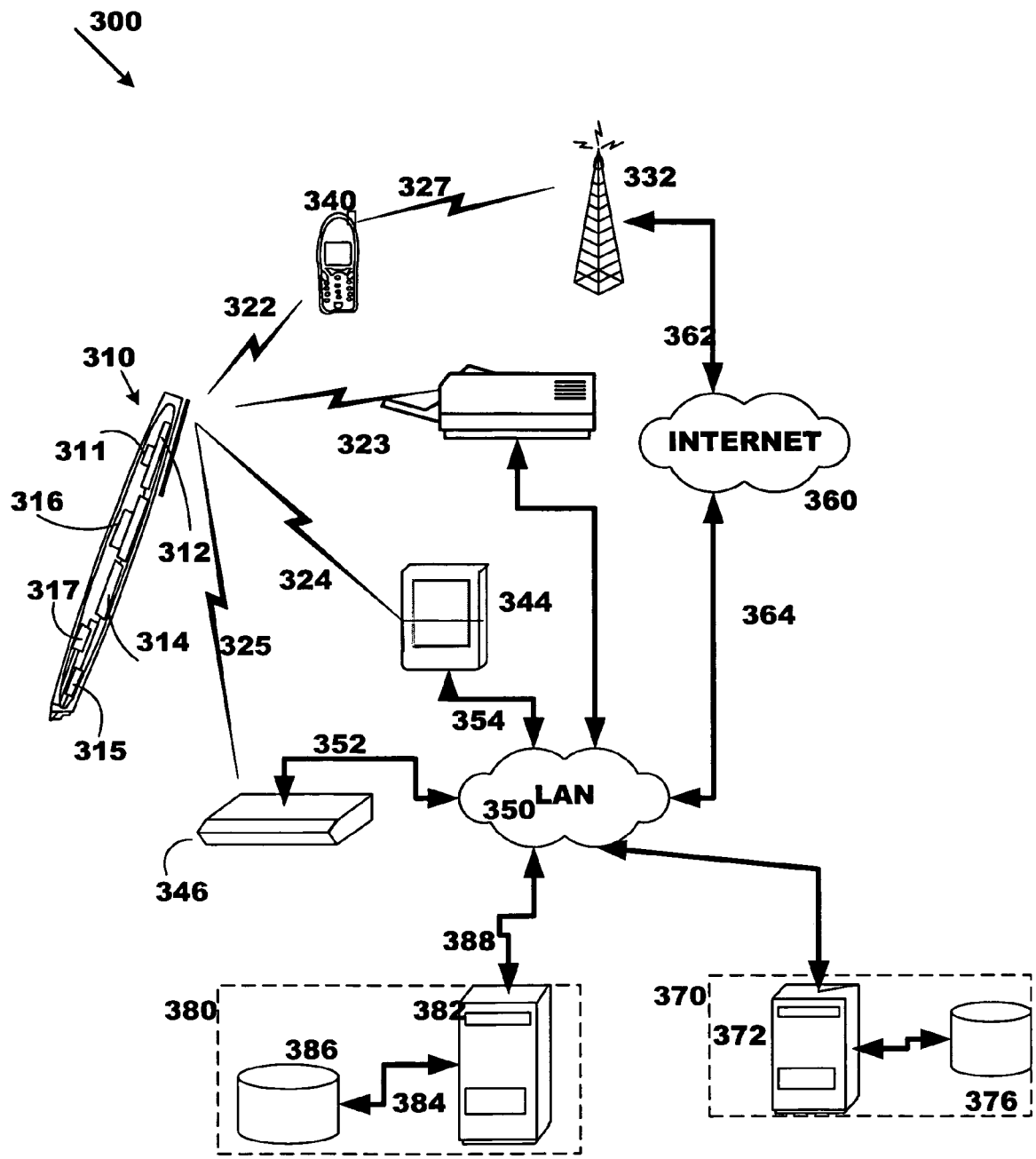
FIG. 3 is a schematic view of an illustrative digital pen user interface system according to an illustrative embodiment of the present application.

Referring to FIG. 3, a schematic representation of an illustrative digital pen processing system 300 is shown. Digital pens allow a user to capture or digitize handwriting or pen strokes that the user writes on a medium such as a piece of paper. An external processor such as a personal computer is often used to process the pen strokes. The ANOTO digital pen 310 and digital paper system available from ANOTO AB of Sweden provides a digital pen/paper system. One digital pen that may be used with the system is the SONY-ERICSSON CHA-30 CHATPEN. The CHATPEN utilizes a BLUETOOTH transceiver 311 in order to communicate with a processor. The ANOTO paper includes a grid for encoding information such as position information that is detected by the CHATPEN. Additional information may be captured including information related to orientation, pressure, location, time, speed and pen attitude. The additional information includes biometric information that may be used to identify or authenticate a user. The biometric information may include data related to a signature profile.

The CHATPEN and ANOTO paper system provide a system for digitizing pen information with a pen that writes using ink on paper printed with an ANOTO pattern such that a written record may be retained. The CHATPEN includes a sensor to detect the ANOTO pattern. The detected pattern identifies the relative pen location on a grid of the pattern using a pattern look-up processor that may be locally or remotely located. The relative location allows the pen stroke and pattern look-up processor to determine where the pen is on a defined logical space of the pattern. Certain logically defined two-dimensional areas of the pattern may be defined as representing certain functions.

Digital Pen 310 includes a processor 314, memory 312, ink 317, a camera or image sensor 315, a battery 316 and a wireless transceiver 311. It also includes biometric sensors (not shown). Writing sensors (not shown) provide data regarding the stroke such as pressure, speed and pen attitude. In an alternative, the pen includes audio/video input/output such as a speaker, haptic feedback servo, buzzer, display, and/or speech synthesizer. Physical input includes an input button.

Using the pen 310, the stroke, biometric and pattern position information is sent to the pen stroke processor via a wireless BLUETOOTH communications channel that is secure across a personal area network. However, a wired connection such as a cradle connected to an IBM compatible PC may be utilized. The embodiments described herein may utilize biometric data for purposes including identification and authentication of a user locally as well as to authenticate a user to an authentication server. User authentication is optionally used to select from a group of available machine user interface access levels. The pen 310 is assigned a unique identification code that is a unique serial number for the pen. The system 300 includes at least one pen 310 that establishes at least one personal area network using BLUETOOTH. The paired device may be a router 346 across connection 325 to provide a gateway using connection 352 to a system LAN 350.

The paired device may include a wireless capable PDA 344 across connections 324 and 354 to the LAN 350. Furthermore, the digital pen 310 may be paired with a cellular telephone 340 using connection 322 through cellular base station 332 using connection 327 and through the Internet 360 to the LAN 350 using packet switched connections 362, 364. Similarly, the digital pen 310 may connect directly to mailing machine 323 using a wireless or wired interface.

Illustrative digital pen processing system 300 includes an authentication server 380 that includes storage 386 connected by connection 384 to processor 382. The server 380 is connected to the LAN 350 using communications channel 388. Here, the server processes the authentication requests for users. Machine input processing server 370 is connected to LAN 350 that is then connected to the mailing machine 323. Server 370 includes processor 372 that is connected to storage 376 using communication channel 374. Other known input devices, servers, processors, networks and communications mechanisms may be used in the digital pen system. Server 370 may preprocess digital pen user inputs such as by counting the number of packages to be shipped before the mailing machine processes the batched user inputs. Similarly, the server 370 may preprocess the data to provide notifications such as sending an email to the intended recipient of each package. The servers and processors utilize Pentium 4 processors and Windows XP. However, other platforms may be utilized. Server 370 may maintain multiple simultaneous active sessions with multiple digital pens so that multiple users may provide input to a single mailing machine at the same time.

Certain embodiments of the present application describe a method of capturing biometric data such as a writing sample that may include a signature. Server 370 may also authenticate the signature. The server 370 optionally manages user access level control to the mailing machine. Server 370 can host mailing machine-digital pen user interface glue logic, data processing logic and access control logic. In other embodiments, the mailing machine includes interface logic to process user input commands received from the digital pen.

Referring to FIG. 4A, a top plan view of an illustrative digital paper form according to an illustrative embodiment of the present application is shown. The form 400 represents a consignee selection for a shipping application. The form includes 4 ANOTO pattern boxes 412, 422, 416, 426 that represent 4 known consignees that may be selected 414, 424, 418, 428. When the user fills in this form, the shipping system receives the selection that is associated with that company. In this embodiment, the form is printed using an ANOTO pattern. Each consignee is associated with a separate checkbox. The mailing system that receives a selection made on the form can retrieve the full consignee address for a database storage location. Accordingly, such a system may be simpler to use because the user would not have to write the complete address for each shipping transaction. Such data may be transmitted as an index or summary data that may be used to obtain complete data.

Referring to FIG. 4B, a top plan view of an illustrative digital paper form according to an illustrative embodiment of the present application is shown. The form 450 represents a digital paper interface to a mailing machine. In an alternative, the forms 400 and 450 are provided to a user on the same form. The user enters destination address information in address block 452 on the form 450, the digital pen system receives the address data and stores it for later use with the mailing machine. The user may enter additional information such as the delivery requirements 454, a recipient email address 467, a number of packages field 462 and the shipping weight 464. When the user has completed writing data on the form, the user signs the signature block to complete the form input. The digital pen system then stores the user input record for later use with the mailing machine at server 370. Such a form can be designed to capture any information normally provided to the mailing machine including a destination address, desired method or class of shipment, desired delivery date, weight, number of packages and additional contact information.

The paper based user interface forms may include preprinted information such as a tracking number, sender's address and/or carrier information. Alternatively, such fields may be absent or blank. In one alternative, the recipient email address information is received at server 370 and a designated recipient software agent running on server 370 sends an email to the intended recipient to alert the recipient that a shipment transaction has been entered. In another alternative, server 370 communicates with the shipping system such as mailing machine 323 and receives a shipping tracking number that is also sent to the intended recipient by the designated recipient software agent.

In another alternative, the digital pen system 300 immediately sends the digital paper based user input to the mailing machine 323 for processing. The server 370 optionally includes software that authenticates the user before sending the digital paper based user input to the mailing machine 323 for processing. If the user cannot be authenticated, the transaction is rejected. The server 370 also optionally includes software that identifies the user and determines whether the user is authorized to send next day shipments before sending the digital paper based user input to the mailing machine 323 for processing. The server 370 also optionally includes software that identifies the user and accounts for the transaction by sending data to a shipping transaction accounting system in addition to sending the digital paper based user input to the mailing machine 323 for processing.

In another alternative embodiment, server 370 stores a batch of digital paper based user input forms to be sent to the mailing machine 323 for processing. The server 370 optionally sends the batch of forms to the mailing machine 323 only when the digital pen 310 is located in close proximity and/or docked to the mailing machine. In yet another alternative, the digital pen is used to store the digital paper based user input data for transfer to the mailing machine 323. Such transfer may occur in a batch when the digital pen 310 is docked to the mailing machine 323.

In an embodiment of the application, a user completes a mailing or shipping transaction using a digital pen and a digital paper user input form. The information that the user enters is captured and transmitted to a mailing machine for transaction completion and label printing. The mailing machine then optionally determines whether the user is authorized to perform the requested function. Additionally, data may be sent to a carrier system or intended recipient consignee to provide advanced shipping notification. Furthermore, the system may use a user profile or entered email address to send the intended recipient a notification that a package is being delivered. The completed paper form may also be used as a transaction receipt and/or record. Because the digital pen may be assigned to a particular user or group of users, the mailing system or external server may process accounting information relating to the transaction. Such a system provides an enhanced user interface for mailing and shipping goods even when the mailing system has a constrained user interface with a small display and many levels of menus. A digital paper based user interface is user friendly and quickly provides paper based form information to remote systems and allows for dynamic completion of shipping or mailing forms.

Figure 5:
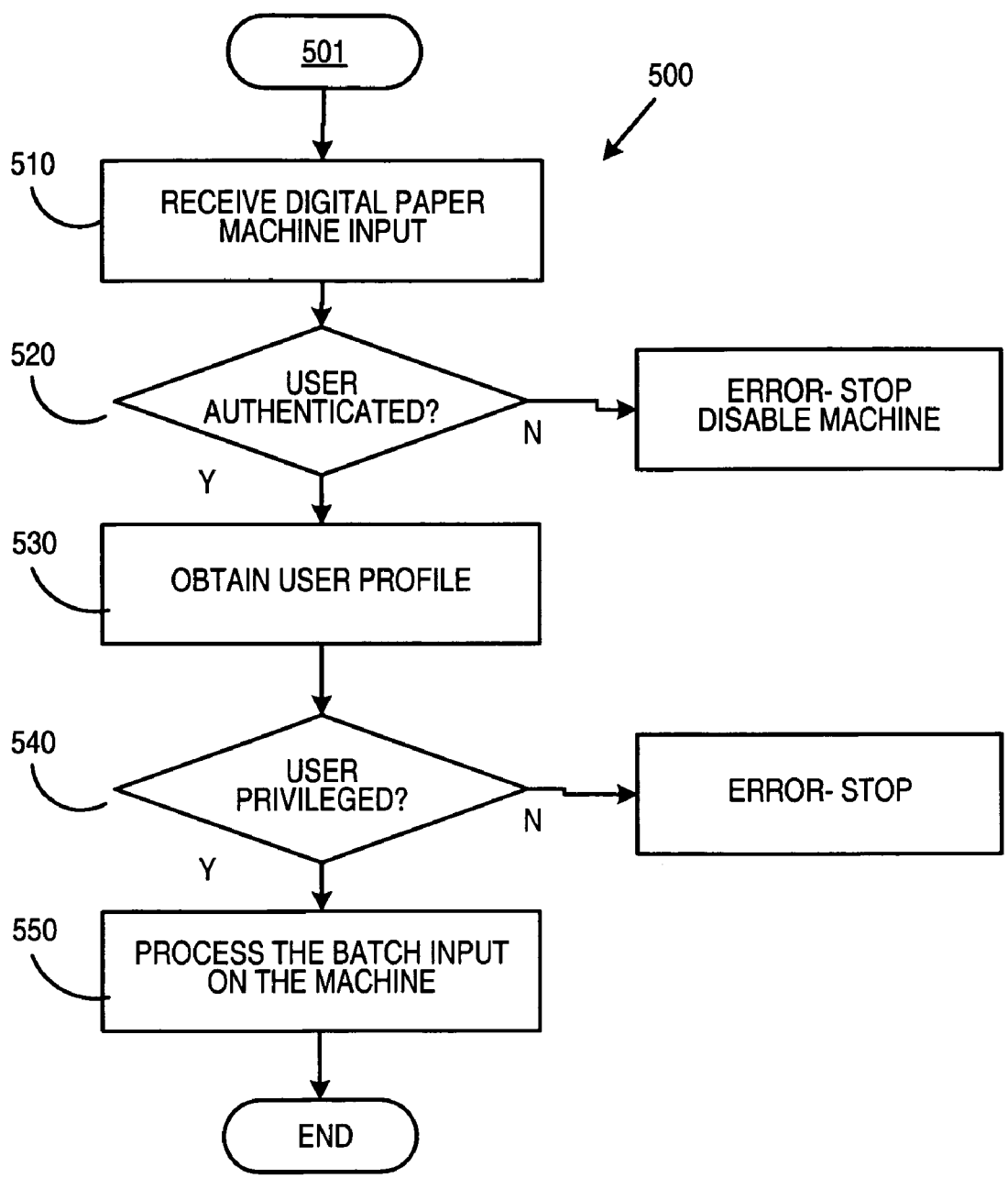
FIG. 5 is a flow chart showing a process for receiving, authenticating and processing digital pen and paper based user input to a business machine according to an illustrative embodiment of the present application.

Referring to FIG. 5 a flow chart showing a process 500 for receiving, authenticating and processing digital pen and paper based user input to a business machine according to an illustrative embodiment of the present application is shown. The process begins in step 501. In step 510, the system receives digital pen and paper based user input. In step 520, the system determines if the user can be authenticated. In step 530, the system obtains a user profile. In step 540, the system determines if the user has sufficient privileges for the desired operations. If so, the system then processes the user input instructions on the business machine in step 550. Optionally, if the user is not privileged, a super user may be queried to determine whether to allow the access. In another alternative, the user may be-permitted a certain number of unprivileged accesses per day.

Figure 6:
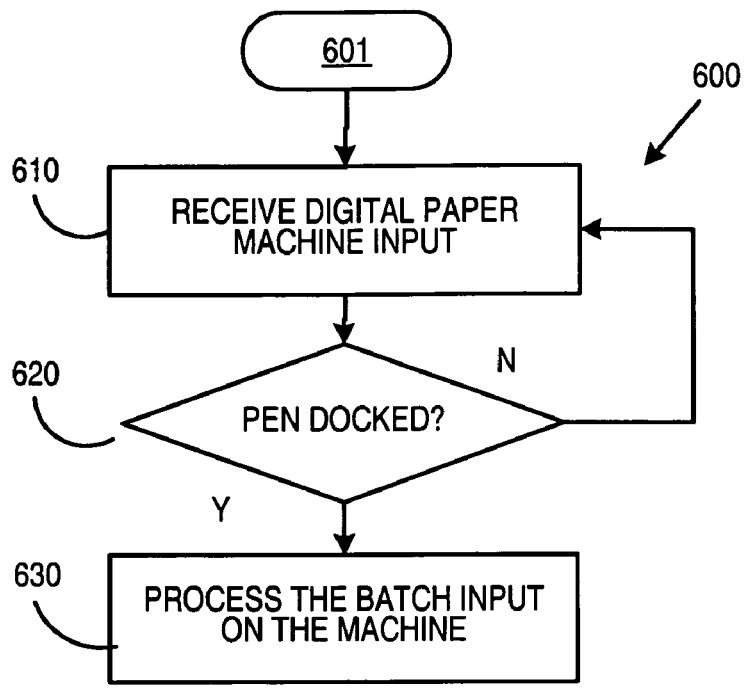
FIG. 6 is a flow chart showing a process for receiving, storing and batching digital pen and paper based user input to a business machine according to an illustrative embodiment of the present application.

Referring to FIG. 6 a flow chart showing a process 600 for receiving, storing and batching digital pen and paper based user input to a business machine according to an illustrative embodiment of the present application is shown. The process begins in step 601. In step 610, the system receives digital pen and paper based user input. In step 620, the system determines if the digital pen is docked. If so, in step 630, the system processes the batch of user input instructions on the business machine. Alternatively, the users may be authenticated. Additionally, other triggering events could start the batch-processing mode including proximity to the mailing machine or selection of a key using the mailing machine interface.

Figure 7:
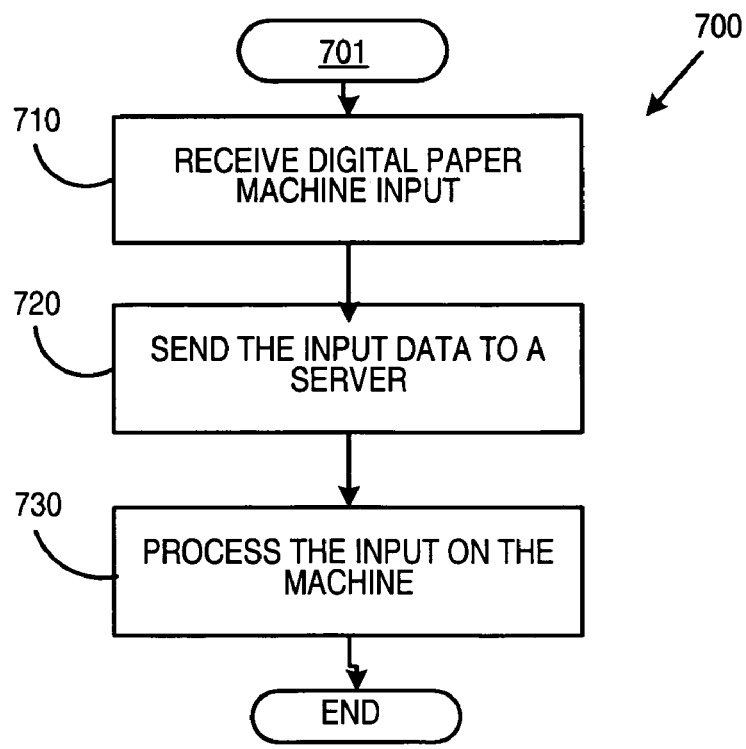
FIG. 7 is a flow chart showing a process for receiving and processing digital pen and paper based user input to a business machine before executing associated instructions according to an illustrative embodiment of the present application.

Referring to FIG. 7 a flow chart showing a process 700 for receiving and processing digital pen and paper based user input to a business machine before executing associated instructions according to an illustrative embodiment of the present application is shown. The process begins in step 701. In step 710, the system receives digital pen and paper based user input. In step 720, the system sends the input to a server so that the server may send advanced shipping notices. In step 730, the system processes the user input instructions on the business machine.

In another alternative embodiment, the forms described in FIGS. 4A and 4B are combined into one form. In another embodiment, summary identifier data could be used for commonly used data records such as consignee address and delivery information. Such shortcuts could be selected using the digital pen or entered as handwritten text that is then recognized. Additionally, a dynamic command set notion is utilized in which users can submit arbitrary commands that are subset of a well-defined command set by using handwriting recognition to translate handwritten commands into ASCII text that are later further translated into valid command. In yet another embodiment, the handwritten digital paper form is attached to the package. Another authorized digital pen having send authorization capability must select a send box on the form before the mailing machine will process the digital paper instructions.

In yet another alternative embodiment, the user handwrites a number on the package. In another embodiment the user uses a prefix of an employee identifier number to ensure a unique number is selected. When the package is delivered to the mailroom for processing, the operator enters the number into the system and the package is then associated with the digital paper form and instructions that were previously entered. In another embodiment, after the digital paper form is completed, a local printer is used to print a unique identifier on a label that is then attached to the package. When the package is sent to the mailroom to be processed, the operator scans or enters the label data to associate the package with the previously entered digital paper data.

The present application describes illustrative embodiments of systems and methods for providing paper based user interfaces to machines. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

What is claimed is:

1. A method for a machine for processing digital paper based machine instructions received from a user utilizing a digital pen and a digital paper form comprising:

receiving digital paper based user input data created using the digital pen and the digital paper form;

determining if the user can be authenticated by processing authentication data present in the digital paper based user input data created using the digital pen and the digital paper form;

when the user is authenticated, obtaining a user profile;

using the user profile to determine if the user has privileges required to process the digital paper based input data; and when the user has the privileges required to process the digital paper based input data, causing the machine to process the digital paper based input data, wherein the digital paper form is not physically handled by the machine, wherein the machine includes a postage machine and the authentication includes verifying user permission to utilize a particular class of shipping service.

2. The method of claim 1 wherein:

the authentication data includes biometric data relating to digital pen strokes.

3. The method of claim 1 wherein:

the machine is disabled if the user cannot be authenticated.

4. The method of claim 1 further comprising:

if the user is not privileged, determining if a privilege exception is warranted.

5. The method of claim 1 further comprising:

sending the digital paper based user input data to a server.

6. The method of claim 1 wherein:

the digital paper based user input data includes summary data.

7. The method of claim 6 further comprising:

using the summary data to obtain complete data.

8. The method of claim 1 wherein:

authenticating the user comprises authenticating the digital pen.

9. The method of claim 1 wherein:

the authentication data comprises a user signature.

10. The method of claim 1 further comprising:

identifying the user; and determining accounting information related to the use of the machine using the identification of the user and the digital paper based machine instructions.

11. A system for processing digital paper based input commands from a user for a machine comprising:
- a processor;
- memory connected to the processor, the memory storing a program for controlling the processor and storing user data; and
- the processor operative with the program operative for:
- receiving digital paper based user input commands created using a digital pen and a digital paper form;
- determining if the user can be authenticated by processing authentication data present in the digital paper based user input data created using the digital pen and the digital paper form;
- when the user is authenticated, causing the machine to process the digital paper based user input commands, wherein the digital paper form is not physically handled by the machine, wherein
- the machine includes a postage machine and the authentication includes verifying user permission to utilize a particular class of shipping service.

12. The system of claim 11, wherein:
if the user is not authenticated, the machine is disabled.

* * * * *